(12) United States Patent
Kondo et al.

(10) Patent No.: US 10,218,244 B2
(45) Date of Patent: Feb. 26, 2019

(54) ELECTRIC ROTATING MACHINE

(71) Applicant: Mitsubishi Electric Corporation, Chiyoda-ku, Tokyo (JP)

(72) Inventors: Masahiro Kondo, Tokyo (JP); Kiyonori Koga, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 252 days.

(21) Appl. No.: 15/104,382

(22) PCT Filed: May 12, 2015

(86) PCT No.: PCT/JP2015/063551
§ 371 (c)(1),
(2) Date: Jun. 14, 2016

(87) PCT Pub. No.: WO2016/181477
PCT Pub. Date: Nov. 17, 2016

(65) Prior Publication Data
US 2017/0126095 A1    May 4, 2017

(51) Int. Cl.
*H02K 9/06*    (2006.01)
*H02K 7/14*    (2006.01)
(Continued)

(52) U.S. Cl.
CPC ............... *H02K 7/14* (2013.01); *H02K 5/20* (2013.01); *H02K 9/06* (2013.01); *H02K 9/10* (2013.01)

(58) Field of Classification Search
CPC .............. H02K 9/06; H02K 9/22; H02K 5/20
See application file for complete search history.

(56) References Cited

U.S. PATENT DOCUMENTS 1,824,839 A    9/1931   Ross
4,208,599 A    6/1980   Armor et al.
(Continued)

FOREIGN PATENT DOCUMENTS

DE    1538897 A1    4/1970
DE    112041 A1     3/1975
(Continued)

OTHER PUBLICATIONS

Extended European Search Report dated Nov. 16, 2017, issued by the European Patent Office in corresponding European Application No. 15884915.8. (13 pages).
(Continued)

*Primary Examiner* — Dang Le
(74) *Attorney, Agent, or Firm* — Buchanan Ingersoll & Rooney PC (57) ABSTRACT

An electric rotating machine does not require management of the gap between a fan guide at a small-diameter portion and a fan fixing portion and can suppress the manufacturing and maintenance costs from increasing. An electric rotating machine is provided with a small-diameter portion fan guide that extends both in a circumferential direction and in an axial direction in such a way as to be provided a space in the radial-direction outer side of a small-diameter portion that is a portion of an extending axle portion, of a rotation axle, that extends in the axial direction from a rotor, the portion being at an axial-direction departing side than a fan fixing portion to which an axial-flow fan is fixed and in such a way that the small-diameter portion fan guide is disposed to be provided a space with the fan fixing portion in the axial direction.

7 Claims, 6 Drawing Sheets

(51) Int. Cl.
       *H02K 5/20*        (2006.01)
       *H02K 9/10*        (2006.01)

(56) References Cited

U.S. PATENT DOCUMENTS

| | | | |
|---|---|---|---|
| 4,712,656 A | 12/1987 | Courtois | |
| 6,346,753 B1* | 2/2002 | Jarczynski | H02K 9/10 |
| | | | 310/53 |
| 2004/0150270 A1* | 8/2004 | Nagayama | H02K 1/32 |
| | | | 310/61 |
| 2014/0152154 A1 | 6/2014 | Kimura et al. | |

FOREIGN PATENT DOCUMENTS

| | | |
|---|---|---|
| JP | 07-203656 A | 8/1995 |
| JP | 2001-298906 A | 10/2001 |
| JP | 2004-274814 A | 9/2004 |

OTHER PUBLICATIONS

First Examination Opinion Notice (Office Action) (with English translation) issued in corresponding Chinese Patent Application No. 201580014759.8, 21 pages (dated Apr. 27, 2018).

\* cited by examiner

ELECTRIC ROTATING MACHINE

TECHNICAL FIELD

The present invention relates to an electric rotating machine in which an axial-flow fan that blows air toward a stator and a rotor is fixed to the rotation axle of the rotor.

BACKGROUND ART

With regard to such an electric rotating machine as described above, an electric rotating machine disclosed in Patent Document 1, described below, is known. Here, the sides, in the axial direction, that depart from the rotor are defined as the axial-direction departing sides. In the technology disclosed in Patent Document 1, on the rotation axle, respective small-diameter portions whose diameters are smaller than those of fan fixing portions are provided at the axial-direction departing side than the fan fixing portions to which axial-flow fans are fixed; the respective radial-direction outer sides of the small-diameter portions are covered with fan guides.

PRIOR ART DOCUMENT

Patent Document

Patent Document 1: Japanese Patent Application Publication No.

SUMMARY OF THE INVENTION

Problems to be Solved by the Invention

However, in the technology disclosed in Patent Document 1, the fan guide provided at the small-diameter portion protrudes in the axial direction up to a position where the fan fixing portion and the fan guide overlap with each other viewing in the radial direction, and is disposed in such a way as to be provided a gap in the radial-direction outer side of the fan fixing portion. Accordingly, in the technology disclosed in Patent Document 1, it is required that in order to prevent the inner circumferential surface of the fan guide at the small-diameter portion from making contact with the outer circumferential surface of the fan fixing portion, the gap in the radial direction is managed; thus, there has been a problem that the manufacturing and maintenance costs increase.

The present invention has been implemented in order to solve the foregoing problems; the objective thereof is to provide an electric rotating machine that does not require management of the gap between the fan guide at the small-diameter portion and the fan fixing portion and that can suppress the manufacturing and maintenance costs from increasing.

Means for Solving the Problems

An electric rotating machine according to the present invention includes a stator, a rotor, a rotation axle, of the rotor, that has an extending axle portion extending in an axial direction from the rotor, a frame that supports the stator and the rotation axle, an axial-flow fan that is fixed to the extending axle portion and blows air toward the stator and the rotor, and a small-diameter portion fan guide that extends both in the circumferential direction and in the axial direction in such a way as to be provided a space in the radial-direction outer side of a small-diameter portion that is a portion, of the extending axle portion, at a side departing from the rotor in the axial direction than a fan fixing portion to which the axial-flow fan is fixed and that has a diameter smaller than that of the fan fixing portion to which the axial-flow fan is fixed, the small-diameter portion fan guide being fixed to the frame; the small-diameter portion fan guide is disposed in such a way as to be provided a space with the fan fixing portion in the axial direction.

Advantage of the Invention

Because the electric rotating machine according to the present invention is configured in such a way that the small-diameter portion fan guide is disposed to be provided a space in the axial direction with the fan fixing portion, the inner circumferential surface of the small-diameter portion fan guide does not make contact with the outer circumferential surface of the fan fixing portion; therefore, because it is not required to manage the radial-direction gap, the manufacturing and maintenance costs can be suppressed from increasing.

MODE FOR CARRYING OUT THE INVENTION

1. Embodiment 1

Figure 1:
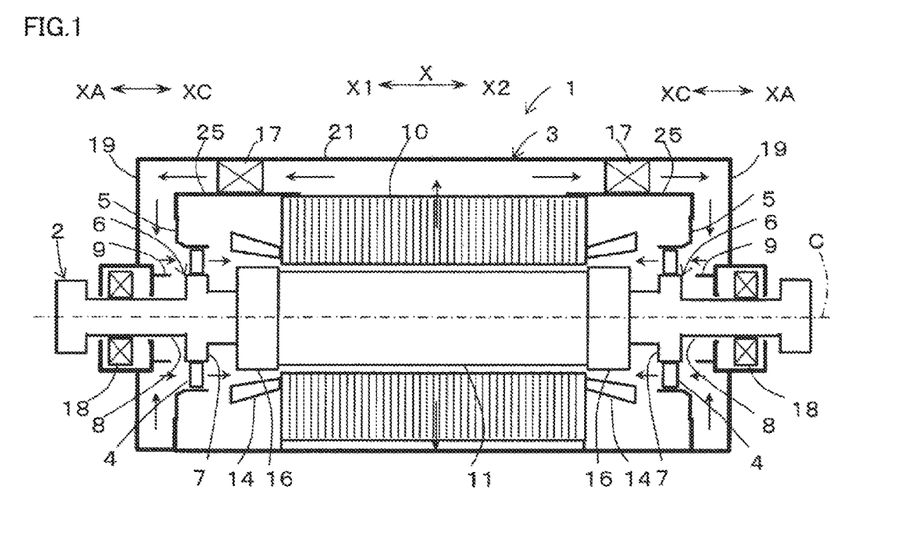
FIG. 1 is a schematic block diagram illustrating an electric rotating machine according to Embodiment 1 of the present invention.
Figure 2:
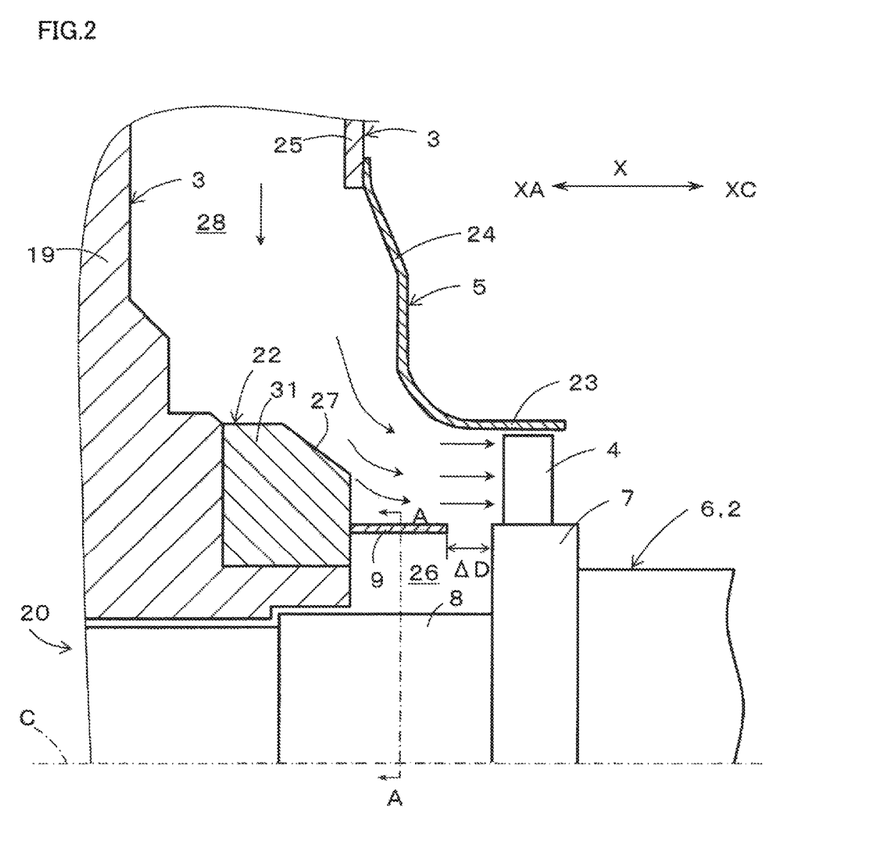
FIG. 2 is a cross-sectional view of principal parts of the electric rotating machine according to Embodiment 1 of the present invention.

An electric rotating machine 1 according to Embodiment 1 will be explained with reference to drawings. FIG. 1 is a cross-sectional view that is taken along a plane passing through a rotation axis center C and schematically illustrates the configuration of the electric rotating machine 1 according to Embodiment 1; FIG. 2 is a partial cross-sectional view of principal parts, taken along a plane passing through the rotation axis center C of the electric rotating machine 1; FIG.

Figure 3:
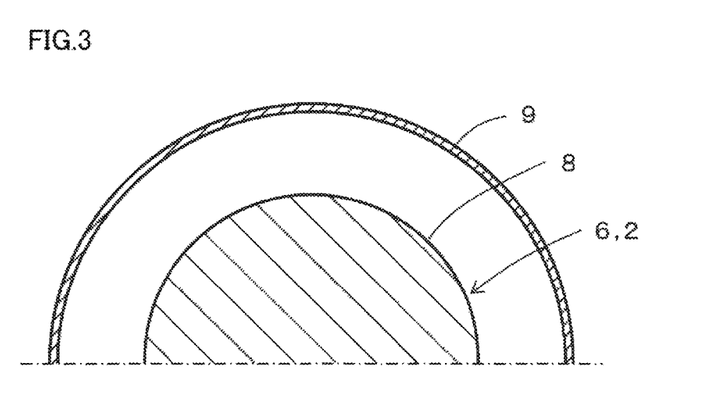
FIG. 3 is a cross-sectional view of principal parts of the electric rotating machine according to Embodiment 1 of the present invention.

3 is a cross-sectional view of principal parts, obtained by cutting a small-diameter portion fan guide 9 and an extending axle portion 6 at the A-A cross-sectional position in FIG. 2 and viewing them toward the axial-direction departing side XA.

The electric rotating machine 1 is provided with a stator 10, a rotor 11, a rotation axle 2 having the extending axle portions 6 that protrude toward the axial direction X from the rotor 11, a frame 3 that supports the stator 10 and the rotation axle 2, and axial-flow fans 4 that are fixed to the corresponding extending axle portions 6 and blow air toward the stator 10 and the rotor 11.

The direction that is parallel to the rotation axis center C of the electric rotating machine 1 is defined as the axial direction X. One side of the axial direction X is defined as an axial-direction first side X1; the other side, which is opposite side of the axial-direction first side X1, is defined as an axial-direction second side X2. At axial-direction first side X1 or the axial-direction second side X2 than the rotor 11, the side departing from the rotor 11 in the axial direction X is defined as an axial-direction departing side XA; the side approaching the rotor 11 in the axial direction X is defined as an axial-direction approaching side XC. At the axial-direction both sides of the axial-direction first side X1 and the axial-direction second side X2 than the rotor 11, the axial-direction departing side XA and the axial-direction approaching side XC are defined. The circumferential direction and the radial direction herein are defined as those with respect to the rotation axis center C of the electric rotating machine 1.

The electric rotating machine 1 is provided with the small-diameter portion fan guide 9 disposed in such a way as to be provided a space in the radial-direction outer side of a small-diameter portion 8, which is a portion of the extending axle portion 6 at the side departing from the rotor 11 in the axial direction X (the axial-direction departing side XA) than a fan fixing portion 7 to which the axial-flow fan 4 is fixed, and which has a diameter smaller than that of the fan fixing portion 7; the small-diameter portion fan guide 9 extends both in the circumferential direction and in the axial direction and is fixed to the frame 3. The small-diameter portion fan guide 9 is disposed in such a way as to be provided a space ΔD with the fan fixing portion 7 in the axial direction X.

In the present embodiment, as illustrated in FIG. 1, there are provided the extending axle portion 6, the fan fixing portion 7, the small-diameter portion 8, the axial-flow fan 4, and the small-diameter portion fan guide 9 at each of the axial-direction first side X1 and the axial-direction second side X2 than the rotor 11; the respective configurations at the axial-direction both sides are similar to each other. Accordingly, for the sake of simplicity in explanation, only the configuration at the axial-direction first side X1 of the rotor 11 will be explained hereinafter, and the explanation for the configuration at the axial-direction second side X2 will be omitted.

1-1. Outline of Configuration of Electric Rotating Machine 1

The electric rotating machine 1 has a stator 10, a rotor 11 disposed with a gap in the radial-direction inner side of the stator 10, and the rotation axle 2, which is an axle member that supports the rotor 11 and rotates integrally with the rotor 11. The stator 10 has a cylindrical tubular stator core in which annular-disk electromagnetic steel plates are put on top of one another in the axial direction X and a stator coil wound around the stator core. The stator coil has stator coil end portions 14 that protrude from the stator core in the axial-direction both sides (axial-direction departing sides XA).

The rotor 11 has a cylindrical tubular rotor core in which annular-disk electromagnetic steel plates are put on top of one another in the axial direction X and a rotor coil wound around the rotor core. The rotor coil has rotor coil end portions that protrude from the rotor core in the both axial-direction both sides (axial-direction departing sides XA). The radial-direction outer side of the rotor coil end portion is covered with a cylindrical tubular covering member 16. The rotor 11 and the rotation axle 2 are coupled with each other in such a way as to rotate integrally with each other. The rotation axle 2 is pivotably supported by the frame 3 through the intermediary of a bearing 18. In the present embodiment, the electric rotating machine 1 is a turbine generator, which is an electric power generator driven by a turbine; the end of the rotation axle 2 at the axial-direction first side X1 or the axial-direction second side X2 is coupled with the turbine (unillustrated).

The rotation axle 2 has the extending axle portion 6 that protrudes in the axial direction X from the rotor 11. The axial-flow fan 4 is fixed to the extending axle portion 6. The axial-flow fan 4 rotates integrally with the rotation axle 2 so as to blow air in the axial direction X toward the stator 10 and the rotor 11. That is to say, the axial-flow fan 4 blows air in the axial direction X from the axial-direction departing side XA to the axial-direction approaching side XC. The gas (air, in this example) blown by the axial-flow fan 4 is supplied to the coil end portions, the gap between the stator 10 and the rotor 11, gaps provided in the stator 10 and the rotor 11, and the like so as to cool the respective portions of the stator 10 and the rotor 11. In the present embodiment, the electric rotating machine 1 is a fully-sealed gas (air) cooling type in which the stator 10, the rotor 11, the axial-flow fan 4, and the like are contained in a fully-sealed space enclosed by the frame 3 and the axial-flow fan 4 circulates gas in the fully-sealed space so that the stator 10 and the rotor 11 are cooled. The air heated by the stator 10 and the rotor 11 flows toward the radial-direction outer side of the stator 10, and then is cooled by a cooler 17 disposed at the radial-direction outer side than the stator 10. Then, the air cooled by the cooler 17 is supplied again to the axial-flow fan 4 so as to circulate.

1-2. Configuration of Air-Blowing Mechanism

The rotation axle 2 of the rotor 11 has the extending axle portion 6 that protrudes toward the axial-direction departing side XA from the rotor 11. In the present embodiment, the rotation axle 2 has the extending axle portion 6 at each of the axial-direction first side X1 and the axial-direction second side X2 than the rotor 11. The extending axle portion 6 is an axle body having a cylindrical tubular outer circumferential surface. The extending axle portion 6 is pivotably supported by the frame 3 through the intermediary of a bearing 18.

The extending axle portion 6 has the fan fixing portion 7 to which the axial-flow fan 4 is fixed. The diameter of the fan fixing portion 7 is larger than that of the portion (the small-diameter portion 8), of the extending axle portion 6, that is situated at the axial-direction departing side XA of the fan fixing portion 7. In the present embodiment 1, the fan fixing portion 7 is formed in such a way as to be cylindrically tubular and concentric with the rotation axis center C. The diameter of the fan fixing portion 7 is larger than that of the portion, of the extending axle portion 6, that is situated at the axial-direction approaching side XC of the fan fixing portion 7. Accordingly, the fan fixing portion 7 is a boss portion that protrudes to the radial-direction outer side than the respective portions thereof at both the axial-direction departing side XA and the axial-direction approaching side XC.

The axial-flow fan 4 has a plurality of blades that protrude from the outer circumferential surface of the fan fixing portion 7 toward the radial-direction outer side. The plurality of blades are arranged in the circumferential direction and are fixed to the radial-direction outer side end of the fan fixing portion 7. Each of the blades is fixed at an angle with which when the rotation axle 2 rotates in a predetermined direction, air is blown in the axial direction X from the axial-direction departing side XA to the axial-direction approaching side XC.

The frame 3 has a tabular supporting wall 19 that extends both in the radial direction and in the circumferential direction at the axial-direction departing side XA than the fan fixing portion 7 and the axial-flow fan 4. In the present embodiment, as illustrated in FIG. 1, the frame 3 has a tubular circumferential wall 21 that encloses the radial-direction outer side of the stator 10, the rotor 11, and the like; the supporting wall 19 is formed in the shape of a disk that protrudes from the axial-direction first side X1 or the axial-direction second side X2 end of the circumferential wall 21 toward radial-direction inner side. The supporting wall 19 has a through-hole 20 penetrating in the axial direction X; the extending axle portion 6 penetrates the through-hole 20 in the axial direction X. The radial-direction inner side end of the supporting wall 19 pivotably supports the outer circumferential surface of the extending axle portion 6 through the intermediary of the bearing 18.

The electric rotating machine 1 has an outer fan guide 5 that is disposed in such a way as to be provided a gap in the radial-direction outer side of the axial-flow fan 4. The outer fan guide 5 is fixed to the frame 3. The outer fan guide 5 separates the space at the radial-direction outer side than the axial-flow fan 4 into the respective spaces at the upstream side and the downstream side of the axial-flow fan 4. In the present embodiment, the outer fan guide 5 separates the space that connects the outlet of the cooler 17 with the inlet of the axial-flow fan 4 from the space that connects the outlet of the axial-flow fan 4 with the inlet of the cooler 17.

As illustrated in FIG. 2, the outer fan guide 5 has a cylindrical tubular fan cover portion 23 disposed in such a way as to be provided a gap in the radial-direction outer side of the axial-flow fan 4 and an annular-disk diaphragm portion 24 that extends from the axial-direction departing side XA end of the fan cover portion 23 to the radial-direction outer side. The fan cover portion 23 and the diaphragm portion 24 are connected by a curved portion.

As illustrated in FIG. 1, in the present embodiment, the frame 3 has an inner wall 25 disposed in such a way as to be provided a space in the radial-direction inner side of the circumferential wall 21. The cooler 17 is disposed in the space between the circumferential wall 21 and the inner wall 25; the space between the circumferential wall 21 and the inner wall 25 is a flow path through which air that enters the cooler 17 and air that is exhausted from the cooler 17 flow. The radial-direction outer side end of the diaphragm portion 24 of the outer fan guide 5 is fixed to the circumferential wall 21 and the inner wall 25.

As illustrated in FIG. 2, the diaphragm portion 24 of the outer fan guide 5 is disposed at the axial-direction approaching side XC of the supporting wall 19 in such a way that a space through which a gas flows is provided; a cylindrical tubular space 28 that extends in the radial direction is formed between the supporting wall 19 and the diaphragm portion 24. In addition, the fan cover portion 23 of the outer fan guide 5 is disposed at the radial-direction outer side than the extending axle portion 6 in such a way that a space through which air flows is provided, and hence there is formed a cylindrical tubular space that extends in the axial direction X at the radial-direction inner side of the fan cover portion 23. After flowing toward the radial-direction inner side in the space 28 between the supporting wall 19 and the diaphragm portion 24, air cooled by the cooler 17 flows toward the axial-direction approaching side XC in the space at the radial-direction inner side of the fan cover portion 23, then supplied to the axial-flow fan 4.

The extending axle portion 6 has the small-diameter portion 8 that is the portion thereof at the axial-direction departing side XA of the fan fixing portion 7 and has a diameter smaller than that of the fan fixing portion 7. The outer circumferential surface of the small-diameter portion 8 is formed in such a way as to be cylindrically tubular and concentric with the rotation axis center C. In the present embodiment, the radial-direction position of the outer circumferential surface of the small-diameter portion 8 is disposed at a position that is more inside in the radial direction than the position of the radial-direction position of the outer circumferential surface of the fan fixing portion 7 by 30% or more (100%, in this example) of the radiai-direction width of the blade of the axial-flow fan 4; thus, disturbance in the air flow due to the level difference between the small-diameter portion 8 and the fan fixing portion 7 cannot be neglected.

A tubular frame boss portion 22 that protrudes toward the axial-direction approaching side XC is formed at the radial-direction inner side end of the supporting wall 19. The supporting wall 19 (the frame boss portion 22) and the fan fixing portion 7 are arranged in such a way as to be provided a space from each other in the axial direction X; the axial-direction approaching side XC portion of the small-diameter portion 8 is not covered with the supporting wall 19 from the radial-direction outer side. Thus, in the radial-direction outer side of the small-diameter portion 8 and in the axial-direction departing side XA of the fan fixing portion 7, there is formed a cylindrical tubular space 26 (referred to as a level-difference space 26, hereinafter) which recessed in the radial direction inner side than the outer circumferential surface of the fan fixing portion 7.

Figure 10:
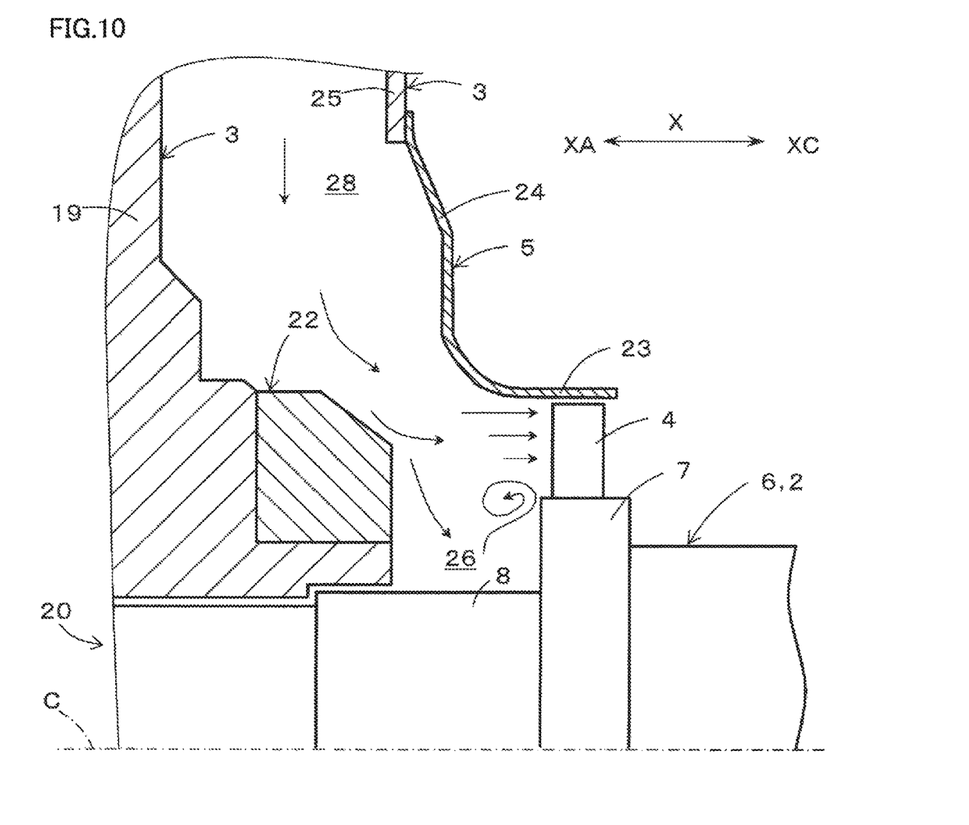
FIG. 10 is a cross-sectional view of principal parts of an electric rotating machine according to a comparative example of the present invention.

FIG. 10 illustrates a cross-sectional view of a comparative example that is different from the present embodiment. Unlike the present embodiment, the small-diameter portion fan guide 9 is not provided in the comparative example in FIG. 10; thus, the level-difference space 26 at the radial-direction outer side of the small-diameter portion 8 is opened to the flow path for air to be supplied to the axial-flow fan 4. Therefore, the air to be supplied to the axial-flow fan 4 is likely to flow into the level-difference space 26. In the present invention, the level-difference space 26 is disposed at a position ahead of the flow of air that flows towards the radial-direction inner side of the space 28 between the supporting wall 19 and the diaphragm portion 24; therefore, the air is like to flow into the level-difference space 26, in particular. Because air flows into the level-difference space 26, a disturbance in the air flow is caused; thus, the flow velocity distribution of air that flows into the axial-flow fan 4 is disturbed and hence the fan efficiency of the axial-flow fan 4 is deteriorated. Moreover, because the cross-sectional area that has been enlarged as much as the level-difference space 26 is suddenly contracted at the inlet of the axial-flow fan 4, a pressure loss is caused; thus, the fan efficiency of the axial-flow fan 4 is deteriorated.

Accordingly, in the present embodiment 1, the electric rotating machine 1 has the small-diameter portion fan guide 9 that is provided a space in the radial-direction outer side of the small-diameter portion 8 and extends both in the circumferential direction and in the axial direction X. The provision of the small-diameter portion fan guide 9 makes it possible to reduce air that flows into the level-difference space 26. The disturbance in an air flow is reduced, so that the disturbance in the flow velocity distribution of air that flows into the axial-flow fan 4 can be decreased. In addition, the pressure loss caused by the decrease in the cross-sectional area of the flow path can be reduced. Therefore, the provision of the small-diameter portion fan guide 9 can suppress the level-difference space 26 from deteriorating the fan efficiency of the axial-flow fan 4.

However, unlike the present embodiment, when as the conventional technology, the small-diameter portion fan guide 9 is disposed in such a way as to extend toward the axial-direction approaching side XC up to a position where the small-diameter portion fan guide 9 and the fan fixing portion 7 overlap each other viewing in the radial direction and in such a way as to be provided a gap in the radial-direction outer side of the fan fixing portion 7, the inner circumferential surface of the small-diameter portion fan guide 9 may make contact with the outer circumferential surface of the fan fixing portion 7. Therefore, because the gap in the radial direction needs to be managed, there has been a problem that the manufacturing and maintenance costs increase. Furthermore, because disposed immediately before the axial-flow fan 4, the small-diameter portion fan guide 9 becomes an obstacle to the flow of air that flows to the axial-flow fan 4 and disturbs the air flow; thus, there has been a problem that the fan efficiency of the axial-flow fan 4 is deteriorated.

Meanwhile, it is conceivable that in order to prevent the inner circumferential surface of the small-diameter portion fan guide 9 from being likely to make contact with the outer circumferential surface of the fan fixing portion 7, the gap in the radial direction is enlarged. For that purpose, it is conceivable that the diameter of the small-diameter portion fan guide 9 is enlarged or that the diameter of the portion, of the fan fixing portion 7, that overlaps the small-diameter portion fan guide 9 is reduced so that a level difference is provided. However, when the diameter of the small-diameter portion fan guide 9 is enlarged, the obstacle to the flow of air that flows to the axial-flow fan 4 becomes larger and hence the fan efficiency of the axial-flow fan 4 is further deteriorated. Moreover, there has been a problem that the manufacturing cost of the fan fixing portion 7 increases in the case where the diameter of the portion, of the fan fixing portion 7, that overlaps the small-diameter portion fan guide 9 is reduced so that a level difference is provided; even in this case, because the small-diameter portion fan guide 9 is disposed in such a way as to be close to the fan fixing portion 7 both in the radial direction and in the axial direction X, these gaps need to be managed; thus, there has been a problem that the manufacturing and maintenance costs increase.

Accordingly, in the present embodiment, the small-diameter portion fan guide 9 is disposed in such a way as to be provided a space $\Delta D$ with the fan fixing portion 7 in the axial direction X. Here, providing a space $\Delta D$ in the axial direction X denotes providing the space $\Delta D$ between the axial-direction position of the small-diameter portion fan guide 9 and the axial-direction position of the fan fixing portion 7. Thus, the small-diameter portion fan guide 9 and the fan fixing portion 7 do not overlap each other viewing in the radial direction. Accordingly, because the inner circumferential surface of the small-diameter portion fan guide 9 does not make contact with the outer circumferential surface of the fan fixing portion 7, it is not required to manage the radial-direction gap; therefore, the manufacturing and maintenance costs can be suppressed from increasing. Moreover, because it is not required to dispose the small-diameter portion fan guide 9 in the radial direction outer side than the fan fixing portion 7, the degree of flexibility of disposing the small-diameter portion fan guide 9 in the radial direction with respect to the fan fixing portion 7 can be raised. For example, it is made possible that the small-diameter portion fan guide 9 is not disposed in the radial direction outer side than the position of the fan fixing portion 7 so that the small-diameter portion fan guide 9 does not become an obstacle to the flow of air that flows to the axial-flow fan 4 or it is made possible that the small-diameter portion fan guide 9 is disposed at the same radial-direction position as the radial-direction position of the outer circumferential surface of the fan fixing portion 7 or disposed in the radial direction inner side than the outer circumferential surface of the fan fixing portion 7 so that the flow of air that flows to the axial-flow fan 4 can appropriately be adjusted.

Moreover, it is made possible that at the upstream side of the axial-flow fan 4, the flow of air that flows to the axial-flow fan 4 can be rectified so as to become a flow that is along the small-diameter portion fan guide 9. Even when the space $\Delta D$ in the axial direction X (referred to as the axial-direction space $\Delta D$, hereinafter) between the small-diameter portion fan guide 9 and the fan fixing portion 7 is provided immediately before the axial-flow fan 4, separation of the flow in the axial direction X is suppressed because in the vicinity of the inlet of the axial-flow fan 4, the dynamic pressure in the axial direction X is high. Therefore, in practice, the pressure loss due to the axial-direction space $\Delta D$ is not large and hence the fan efficiency of the axial-flow fan 4 does not fall largely.

The axial-direction space $\Delta D$ between the small-diameter portion fan guide 9 and the fan fixing portion 7 is set to a width that is larger than the width obtained by multiplying the variation width of the space between the small-diameter portion fan guide 9 and the fan fixing portion 7 by a safety factor (for example, 10); the foregoing variation width depends on, for example, the variation of the axial-direction position of the rotation axle 2 and the respective manufacturing and mounting errors of the small-diameter portion fan guide 9, the fan fixing portion 7, and the like. In the present embodiment, the axial-direction space $\Delta D$ between the small-diameter portion fan guide 9 and the fan fixing portion 7 is set to a width that is the same as or wider than 50% (90%, in this example) of the axial-direction width of the blade of the axial-flow fan 4. This configuration makes it possible to suppress the manufacturing and maintenance costs from increasing, because at the time of manufacturing or maintenance, it is not required to manage the axial-direction space $\Delta D$ between the small-diameter portion fan guide 9 and the fan fixing portion 7.

In the present embodiment, the outer circumferential surface of the portion, of the small-diameter portion 8, that overlaps the small-diameter portion fan guide 9 viewing in the radial direction is formed in such a way as to be constant-diameter and cylindrical tubular. The small-diameter portion fan guide 9 is formed in such a way as to be cylindrically tubular and concentric with the rotation axis center C. A constant space is provided between the outer circumferential surface of the small-diameter portion 8 and the inner circumferential surface of the small-diameter portion fan guide 9, so that a cylindrical tubular space is formed. Because the small-diameter portion fan guide 9 is formed in such a way as to be cylindrical tubular, the manufacturing cost can be reduced. Moreover, the air flow can readily be rectified in the axial direction X.

The end, at least at the axial-direction approaching side XC, of the outer circumferential surface of the small-diameter portion fan guide 9 and the end, at least at the axial-direction departing side XA, of the outer circumferential surface of the fan fixing portion 7 are arranged in such a way that the respective radial-direction positions thereof are substantially equal to each other (the difference between the respective radial distances, from the rotation axis center C, of the foregoing ends is within the range of ±5%). In the present embodiment, the small-diameter portion fan guide 9 is formed in such a way as to be constant-diameter and cylindrically tubular; the overall outer circumferential surface of the small-diameter portion fan guide 9 and the outer circumferential surface of the fan fixing portion 7 are arranged in such a way that the respective radial-direction positions thereof are substantially equal to each other (within the range of ±5%). The small-diameter portion fan guide 9 is disposed in such a way as to overlap the fan fixing portion 7 viewing in the axial direction X. Because the axial-flow fan 4 is disposed on the extended line of an air flow rectified by the small-diameter portion fan guide 9, the rectified air flow can directly he supplied to the axial-flow fan 4; thus, the fan efficiency of the axial-flow fan 4 can be raised.

The end, at the axial-direction departing side XA, of the small-diameter portion fan guide 9 is fixed to the end, at the axial-direction approaching side XC, of the frame boss portion 22. Accordingly, the small-diameter portion fan guide 9 protrudes toward the axial-direction approaching side XC from the frame boss portion 22. In the present embodiment, the portion, at the axial-direction approaching side XC and at the radial-direction outer side, of the frame boss portion 22 is constituted of engaged a cylindrical tubular fan fixing portion 31. In addition, the small-diameter portion fan guide 9 is fixed to the fan fixing portion 31. For example, it is desirable that a groove, which corresponds to the shape of the fan fixing portion 31 and is opened toward the axial-direction approaching side XC, is provided in the fan fixing portion 31 and that the end, at the axial-direction departing side XA, of the small-diameter portion fan guide 9 is inserted into the groove and a bolt or the like fixes both the small-diameter portion fan guide 9 and the fan fixing portion 31. A slant surface 27 that faces toward the axial-direction approaching side XC and the radial-direction outer side, is provided at the end, at the axial-direction approaching side XC and at the radial-direction outer side, of the frame boss portion 22 (the fan fixing portion 31). The slant surface 27 is disposed at the radial-direction outer side of the small-diameter portion fan guide 9.

The direction of the flow of air that flows toward the radial-direction inner side in the space 28 between the supporting wall 19 and the diaphragm portion 24 is gradually changed by the frame boss portion 22 and the small-diameter portion fan guide 9; as a result, the foregoing flow of air flows toward the axial-direction approaching side XC.

2. Embodiment 2

Figure 4:
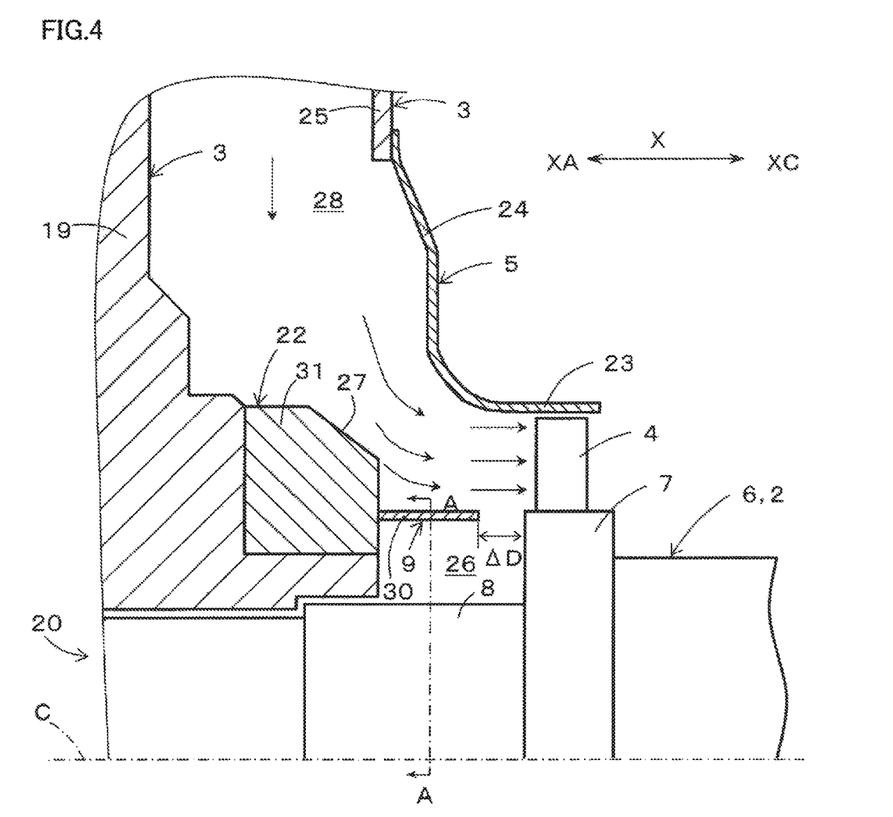
FIG. 4 is a cross-sectional view of principal parts of an electric rotating machine according to Embodiment 2 of the present invention.
Figure 5:
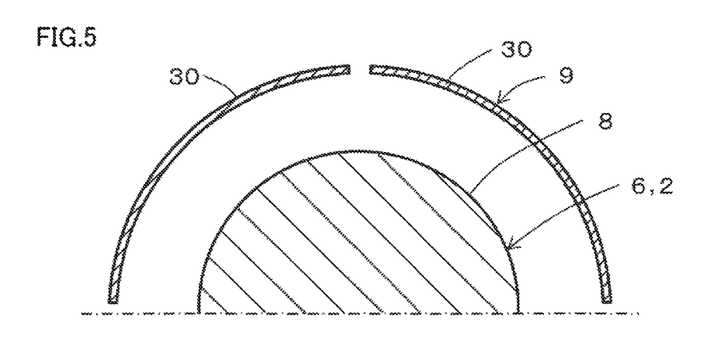
FIG. 5 is a cross-sectional view of principal parts of the electric rotating machine according to Embodiment 2 of the present invention.

Next, the electric rotating machine 1 according to Embodiment 2 will be explained. FIG. 4 is a cross-sectional view, of principal parts of the electric rotating machine 1 according to the present embodiment, that is taken along a plane passing through the rotation axis center C; FIG. 5 is a cross-sectional view of principal parts, obtained by cutting the small-diameter portion fan guide 9 and the extending axle portion 6 at the A-A cross-sectional position in FIG. 4 and by viewing them toward the axial-direction departing side XA. Because the upper and lower parts of the foregoing view is vertically symmetric with each other, the view of the lower part is omitted in FIG. 5.

As illustrated in FIGS. 4 and 5, the small-diameter portion fan guide 9 in the present embodiment is divided into divisions in the circumferential direction. Accordingly, even when the rotation axle 2 is supported by the frame 3, it is possible to individually mount the respective divisions (referred to as divided fan guides 30, hereinafter)), which are obtained by dividing the small-diameter portion fan guide 9 in the circumferential direction, in the frame 3 or to individually remove the respective divisions from the frame 3. Therefore, the working efficiency of mounting or maintaining the small-diameter portion fan guide 9 can be raised. Moreover, the respective shapes of the divided fan guides 30 or mounting thereof are individually changed when the inflow amount of air that flows into the axial-flow fan 4 varies, so that the inflow amounts, at the respective circumferential-direction positions, of air that flows into the axial-flow fan 4 is adjusted and hence the variation in the circumferential-direction inflow amount can be reduced. In the present embodiment, as illustrated in FIG. 1, the cooler 17 is mounted at one circumferential-direction part of the electric rotating machine 1; thus, the inflow amount of air that flows into the axial-flow fan 4 is liable to vary.

The configurations in Embodiment 2 other than the portions that are modified because the small-diameter portion fan guide 9 is divided in the circumferential direction into the divisions are the same as those in Embodiment 1; therefore, the explanation therefor will be omitted.

In the present embodiment, the small-diameter portion fan guide 9 has a shape in which the cylinder (i.e., the small-diameter portion fan guide 9) is divided by planes passing through the center axis thereof into two or more divisions spaced a interval in the circumferential direction (into 4 divisions spaced at constant interval, in this example). That is to say, each of the divided fan guides 30 has a shape in which a rectangular plate having sides that are parallel to the axial direction is bent in an arc-shaped manner along the circumferential direction. The respective divided fan guides 30 are individually fixed to the frame 3 (the frame boss portion 22).

In the example illustrated in FIG. 5, the divided fan guides 30 having the same shape are mounted over the whole circumference. However, in order to adjust the inflow amount at each of the circumferential-direction portions, the respective shapes, at the circumferential-direction portions, of the small-diameter portion fan guide 9 may differ from one another. For example, some of the divided fan guides 30 may not be mounted in the frame 3; the gap between the divided fan guides 30 that are next to each other may be enlarged; alternatively, the lengths, in the axial direction X, of the some divided fan guides 30 may be shortened. At the circumferential-direction portion, of the small-diameter portion fan guide 9, where the area is reduced, the inflow amount of air that flows into the axial-flow fan 4 can be reduced.

In the example illustrated in FIG. 5, the respected divided fan guides 30 are fixed to the frame 3 in such a way that the respective radial-direction positions thereof are the same as one another. However, for the purpose of, for example, adjusting the inflow amount at each of the circumferential-direction portions, the respective radial-direction positions of the divided fan guides 30 may individually be changed. At the circumferential-direction portion, of the small-diameter portion fan guide 9, where the radial-direction position is changed to a position that is at the radial-direction inner side thereof, the inflow amount of air that flows into the axial-flow fan 4 can be reduced.

For example, the frame 3 may be configured in such a way that the fixing positions thereof, to which the respective divided fan guides 30 are fixed can individually be changed in the radial direction. For that purpose, the fixed portion, on the frame 3, of the small-diameter portion fan guide 9 is divided in the circumferential direction in accordance with the respective circumferential-direction positions of the divided fan guides 30 so that the respective fixing positions thereof can individually be changed in the radial direction. Alternatively, it may be allowed that the fan fixing portion 31 of the frame 31 is divided in the circumferential direction and the respective radial-direction positions of the divided fan fixing portions 31 are individually changed in such a way as to be different from one another so that the respective radial-direction positions of the divided fan guides 30 are changed.

Further alternatively, the frame 3 may be configured in such a way that although the respective fixing positions of the divided fan guides 30 cannot be changed in the radial direction, the radial-direction positions of the divided fan guides 30 can be changed. For example, it may be allowed that the divided fan guide 30 is formed in such a way as to have an arc-plate-shaped portion extending from the end, at the axial-direction approaching side XC, of the fixing portion to be fixed to the frame 3 toward the radial-direction inner side and in such a way as to extend from the end, at the radial-direction inner side, of the arc-plate-shaped portion toward the axial-direction approaching side XC and that the radial-direction position of the divided fan guide 30 can be changed by adjusting the radial-direction width of the arc-plate-shaped portion.

3. Embodiment 3

Figure 6:
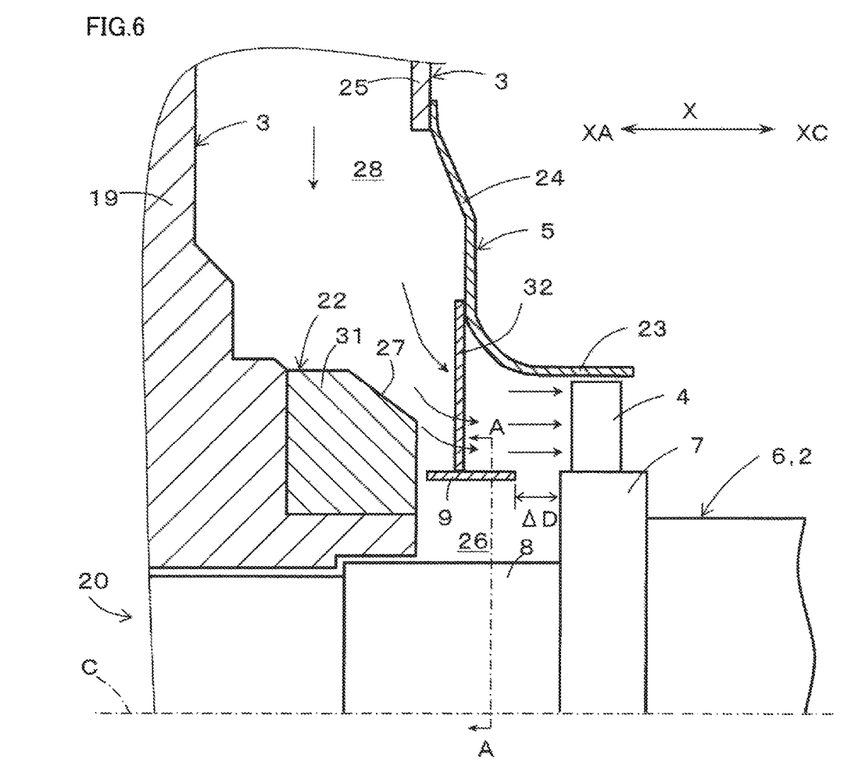
FIG. 6 is a cross-sectional view of principal parts of an electric rotating machine according to Embodiment 3 of the present invention.
Figure 7:
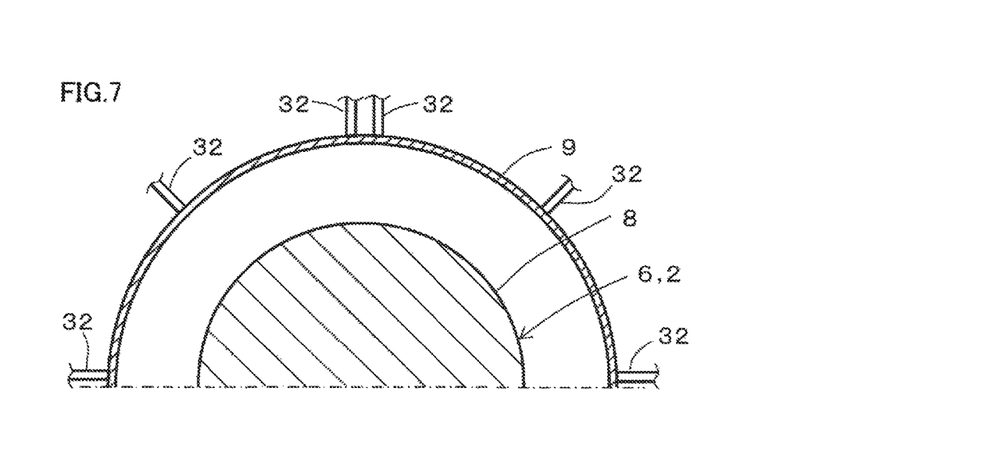
FIG. 7 is a cross-sectional view of principal parts of the electric rotating machine according to Embodiment 3 of the present invention.

Next, the electric rotating machine 1 according to Embodiment 3 will be explained. FIG. 6 is a cross-sectional view, of principal parts of the electric rotating machine 1 according to the present embodiment, that is taken along a plane passing through the rotation axis center C; FIG. 7 is a cross-sectional view of principal parts, obtained by cutting the small-diameter portion fan guide 9 and the extending axle portion 6 at the A-A cross-sectional position in FIG. 6 and by viewing them toward the axial-direction departing side XA. Because the upper and lower parts of the foregoing view is vertically symmetric with each other, the view of the lower part is omitted in FIG. 7.

In the present embodiment, as illustrated in FIGS. 6 and 7, a radial-direction supporting portion 32 extending in the radial direction fixes the small-diameter portion fan guide 9 to the outer fan guide 5. This configuration makes it possible to fix the small-diameter portion fan guide 9 to the frame 3 through the intermediaries of the radial-direction supporting portion 32 and the outer fan guide 5. Therefore, it is not required to provide a dedicated fixing portion for fixing the small-diameter portion fan guide 9 to the frame 3. Accordingly, it can be prevented that fixing portions, for the small-diameter portion fan guide 9, that are provided in the frame 3 raises the manufacturing cost, and it is made possible to deal with the case where it is difficult to provide the fixing portions for the small-diameter portion fan guide 9 in the frame 3. Moreover, by changing the shape of the radial-direction supporting portion 32, the disposition of the small-diameter portion fan guides 9 can be changed without changing the shape of the frame 3. The configurations in Embodiment 3 other than the portions that are modified because the radial-direction supporting portions 32 fix the small-diameter portion fan guide 9 to the outer fan guide 5 are the same as those in Embodiment 1, described above; therefore, the explanation therefor will be omitted.

In the present embodiment, the radial-direction supporting portions 32 are provided in the circumferential direction. The radial-direction supporting portion 32 is made of a rod-shaped (or tabular) member that extends from the outer circumferential surface of the small-diameter portion fan guide 9 toward the radial-direction outer side and is integrally coupled with the small-diameter portion fan guide 9. A fixation member (unillustrated) such as a bolt fixes the end, at the radial-direction outer side, of each of the radial-direction supporting portions 32 to the outer fan guide 5 (the diaphragm portion 24).

In the present embodiment, the small-diameter portion fan guide 9 is disposed in such a way as to be provided a space in the axial direction X with the portion (the frame boss portion 22, in this example), of the frame 3, that is situated in the axial-direction departing side XA of the fan fixing portion 7. Because the small-diameter portion fan guide 9 is not directly supported by the frame 3, the degree of flexibility of the disposition, in the axial direction X, of the small-diameter portion fan guide 9 can be raised.

4. Embodiment 4

Figure 8:
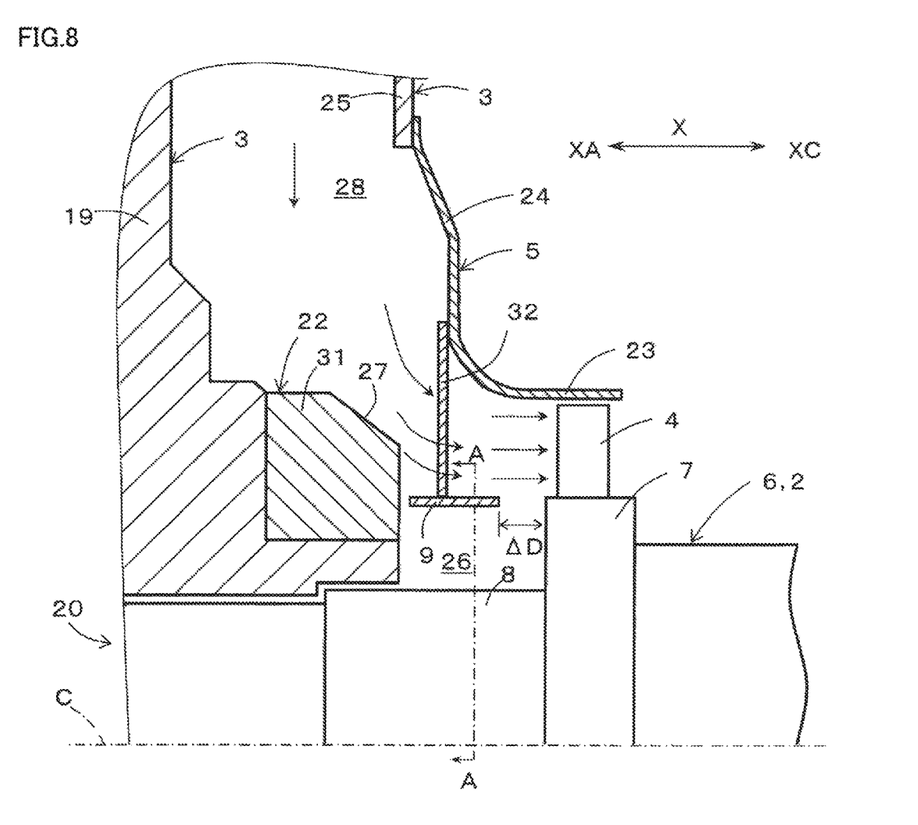
FIG. 8 is a cross-sectional view of principal parts of an electric rotating machine according to Embodiment 4 of the present invention.
Figure 9:
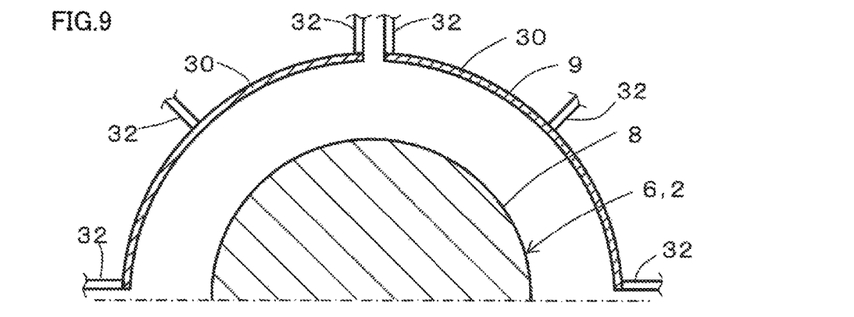
FIG. 9 is a cross-sectional view of principal parts of the electric rotating machine according to Embodiment 4 of the present invention.

Next, the electric rotating machine 1 according to Embodiment 4 will be explained. FIG. 8 is a cross-sectional view, of principal parts of the electric rotating machine 1 according to the present embodiment, that is taken along a plane passing through the rotation axis center C; FIG. 9 is a cross-sectional view of principal parts, obtained by cutting the small-diameter portion fan guide 9 and the extending axle portion 6 at the A-A cross-sectional position in FIG. 8 and by viewing them toward the axial-direction departing side NA. Because the upper and lower parts of the foregoing view is vertically symmetric with each other, the view of the lower part is omitted in FIG. 9.

As illustrated in FIGS. 8 and 9, in the present embodiment, the small-diameter portion fan guide 9 is divided in the circumferential direction; the radial-direction supporting portions 32 extending in the radial direction fix the respective divided fan guides 30, which are obtained by dividing the small-diameter portion fan guide 9, to the outer fan guide 5. This configuration demonstrates an effect the same as that of Embodiment 2 or 3; concurrently, this configuration demonstrates a peculiar effect by combining Embodiment 2 with Embodiment 3. In other words, by changing the shape of the radial-direction supporting portion 32, the arrangement of the positions of the divided fan guides 30 in the radial direction, in the circumferential-direction, or in the axial direction X can readily be changed. For example, by changing the radial-direction length of the radial-direction supporting portion 32, the radial-direction position of each of the divided fan guides 30 can readily be changed. Accordingly, unlike Embodiment 2, it is not required to provide a mechanism of changing the radial-direction position of the fixing portion for fixing the divided fan guide 30 to the frame 3. The configurations in Embodiment 4 other than the portions that are modified because the radial-direction supporting portions 32 fix each of the divided fan guides 30 to the outer fan guide 5 are the same as those in Embodiment 1 or Embodiment 2, described above; therefore, the explanation therefor will be omitted.

In the present embodiment, two or more (three, in this example) radial-direction supporting portions 32 are provided in each of the divided fan guides 30. Each of the radial-direction supporting portions 32 is made of a rod-shaped (or tabular) member that extends from the divided fan guide 30 toward the radial-direction outer side and is integrally coupled with the divided fan guide 30. A fixation member (unillustrated) such as a bolt fixes the end, at the radial-direction outer side, of each of the radial-direction supporting portions 32 to the outer fan guide 5 (the diaphragm portion 24).

[Other Embodiments]

Lastly, other embodiments of the present invention will be explained. Each of the configurations of embodiments to be explained below is not limited to be separately utilized but can be utilized in combination with the configurations of other embodiments as long as no discrepancy occurs.

(1) In each of the foregoing embodiments, there has been explained the case where there are provided the extending axle portion 6, the fan fixing portion 7, the small-diameter portion 8, the axial-flow fan 4, and the small-diameter portion fan guide 9 at each of the axial-direction first side X1 and the axial-direction second side X2 than the rotor 11 and where the respective configurations at the both sides in the axial direction are similar to each other. However, the extending axle portion 6, the fan fixing portion 7, the small-diameter portion 8, the axial-flow fan 4, and the small-diameter portion fan guide 9 may be provided at least at any one of the axial-direction first side X1 and the axial-direction second side X2; all or some of the foregoing members may not be provided at the both sides in the axial direction.

(2) In each of the foregoing embodiments, there has been explained the case where the electric rotating machine 1 is a fully-sealed gas (air) cooling type in which air is circulated in a fully-sealed space and where the electric rotating machine 1 is provided with the cooler 17. However, the electric rotating machine 1 may be an open gas (air) cooling type in which air is taken in from the outside; the cooler 17 may not be provided.

(3) In each of the foregoing embodiments, there has been explained the case where the electric rotating machine 1 is a turbine generator. However, the electric rotating machine 1 may be an electric rotating machine other than a turbine generator; moreover, the electric rotating machine 1 may be configured in such a way as to include any one or both of an electric power generator and an electric motor.

(4) In each of the foregoing embodiments, there has been explained the case where the portion, at the axial-direction approaching side XC of the fan fixing portion 7, of the extending axle portion 6 has a diameter smaller than that of the fan fixing portion 7. However, it is only required that the extending axle portion 6 be provided with the small-diameter portion 8 obtained by making the diameter of the portion, at the axial-direction departing side XA of the fan fixing portion 7, of the extending axle portion 6 smaller than that of the fan fixing portion 7; the portion, at the axial-direction approaching side XC of the fan fixing portion 7, of the extending axle portion 6 may have a diameter the same as or larger than that of the fan fixing portion 7.

(5) in each of the foregoing embodiments, there has been explained the case where the outer circumferential surface of the fan fixing portion 7 is formed in such a way as to be constant-diameter and cylindrically tubular. However, the cuter circumferential surface of the fan fixing portion 7 may have a shape in which the radial-direction position thereof changes along the axial direction X.

(6) In Embodiment 1, there has been explained the case where the small-diameter portion fan guide 9 is formed in such a way as to be cylindrical tubular. However, the small-diameter portion fan guide 9 may have an arbitrary shape, as long as it extends both in the circumferential direction and in the axial direction X in such a way as to be provided a space in the radial-direction outer side of the small-diameter portion 8. For example, the small-diameter portion fan guide 9 may be formed in such a way as to have a tubular shape other than a cylindrical tubular shape; as illustrated in Embodiment 2 or 4, gaps or notches may be provided in some portions, in the circumferential direction, of the small-diameter portion fan guide 9.

(7) In Embodiments 1 and 2, there has been explained the case where the electric rotating machine 1 has the outer fan guide 5 disposed at the radial-direction outer side of the axial-flow fan 4. However, the electric rotating machine 1 may be configured in such a way that it does not include the outer fan guide 5.

In the scope of the present invention, the embodiments thereof can freely be combined with one another and can appropriately be modified or omitted.

INDUSTRIAL APPLICABILITY

The present invention can appropriately be applied to an electric rotating machine in which an axial-flow fan that blows air toward a stator and a rotor is fixed to the rotation axle of the rotor.

DESCRIPTION OF REFERENCE NUMERALS

1: electric rotating machine
2: rotation axle
3: frame
4: axial-flow fan
5: outer fan guide
6: extending axle portion
7: fan fixing portion
8: small-diameter portion
9: small-diameter portion fan guide
10: stator
11: rotor
17: cooler
19: supporting wall
22: frame boss portion
23: fan cover portion
24: diaphragm portion
25: inner wall
26: level-difference space
30: divided fan guide
32: radial-direction supporting portion
C: rotation axis center
X: axial direction
X1: axial-direction first side
X2: axial-direction second side
XA: axial-direction departing side
XC: axial-direction approaching side
ΔD: axial-direction space

The invention claimed is:

1. An electric rotating machine comprising:
a stator;
a rotor;
a rotation axle, of the rotor, that has an extending axle portion extending in an axial direction from the rotor;
a frame that supports the stator and the rotation axle;
an axial-flow fan that is fixed to the extending axle portion and blows air in the axial direction toward the stator and the rotor; and a small-diameter portion fan guide that extends both in a circumferential direction and in the axial direction in such a way as to be provided in a space in a radial-direction outer side of a small-diameter portion that is a portion, of the extending axle portion, at a side departing from the rotor in the axial direction relative to a fan fixing portion to which the axial-flow fan is fixed and that has a diameter smaller than that of the fan fixing portion, the small-diameter portion fan guide being fixed to the frame, wherein the small-diameter portion fan guide is disposed in such a way as to be provided with a space from the fan fixing portion in the axial direction and is divided in the circumferential direction.

2. The electric rotating machine according to claim 1, further including an outer fan guide disposed in such a way as to be fixed to the frame and provided in a gap in the radial-direction outer side of the axial-flow fan, wherein each of divisions of the small-diameter portion fan guide is fixed to the outer fan guide by a radial-direction supporting portion that extends in the radial direction.

3. The electric rotating machine according to claim 2, wherein respective radial positions of the divisions of the small-diameter portion fan guide can individually be changed.

4. The electric rotating machine according to claim 1, wherein respective circumferential-direction portions of the small-diameter portion fan guide differ in shape from one another.

5. An electric rotating machine comprising:
- a stator;
- a rotor;
- a rotation axle, of the rotor, that has an extending axle portion extending in an axial direction from the rotor;
- a frame that supports the stator and the rotation axle;
- an axial-flow fan that is fixed to the extending axle portion and blows air in the axial direction toward the stator and the rotor;
- a small-diameter portion fan guide that extends both in the circumferential direction and in the axial direction in such a way as to be provided in a space in the radial-direction outer side of a small-diameter portion that is a portion, of the extending axle portion, at a side departing from the rotor in the axial direction relative to a fan fixing portion to which the axial-flow fan is fixed and that has a diameter smaller than that of the fan fixing portion, the small-diameter portion fan guide being fixed to the frame; and
- an outer fan guide disposed in such a way as to be fixed to the frame and provided in a gap in the radial-direction outer side of the axial-flow fan, and
- wherein the small-diameter portion fan guide is disposed in such a way as to be provided with a space from the fan fixing portion in the axial direction and is fixed to the outer fan guide by a radial-direction supporting portion that extends in the radial direction.

6. The electric rotating machine according to claim 5, wherein the small-diameter portion fan guide is divided in the circumferential direction, and
wherein each of divisions of the small-diameter portion fan guide is fixed to the outer fan guide by a radial-direction supporting portion.

7. The electric rotating machine according to claim 5, wherein the small-diameter portion fan guide is disposed in such a way as to be provided in a space in the axial direction of a portion, of the frame, that is disposed at a side departing from the rotor in the axial direction relative to the fan fixing portion.

* * * * *